United States Patent [19]

Olson

[11] 4,311,932
[45] Jan. 19, 1982

[54] LIQUID COOLING FOR INDUCTION MOTORS

[75] Inventor: Raymond N. Olson, Rockford, Ill.

[73] Assignee: Sundstrand Corporation, Rockford, Ill.

[21] Appl. No.: 116,010

[22] Filed: Jan. 28, 1980

[51] Int. Cl.³ .............................................. H02K 9/00
[52] U.S. Cl. ........................................ 310/61; 310/59
[58] Field of Search .................... 310/54, 52, 57, 58, 310/59, 60 R, 60 A, 61, 64, 65

[56] References Cited

U.S. PATENT DOCUMENTS

| | | | |
|---|---|---|---|
| 2,951,954 | 9/1960 | Willyoung | 310/61 |
| 3,098,941 | 7/1963 | Willyoung | 310/54 |
| 3,188,833 | 6/1965 | Robinson | 310/54 |
| 3,261,295 | 7/1966 | White | 310/54 |
| 3,480,810 | 11/1969 | Potter | 310/54 |
| 3,588,557 | 6/1971 | Kilgore | 310/61 |
| 3,629,628 | 12/1971 | Rank | 310/61 |
| 3,684,906 | 8/1972 | Lenz | 310/61 |
| 4,013,908 | 3/1977 | Weghaupt | 310/61 |

*Primary Examiner*—R. Skudy
*Attorney, Agent, or Firm*—Wegner, Stellman, McCord, Wood & Dalton

[57] ABSTRACT

An induction motor is disclosed which utilizes a liquid in intimate contact with the rotor and stator conductors for cooling and yet minimizes the disadvantages of high rotational drag losses associated with conventional spray cooled motors. Cooling liquid is conducted through a hollow rotor shaft and directed to a cavity at the center of the magnetic length of the rotor. The cavity is formed by separating two adjacent rotor laminations. The cooling liquid flows axially from the central cavity toward the rotor ends through slots which contain the rotor conductors. A sealing band is provided around the rotor laminations to prevent cooling liquid from entering the air gap between the rotor and the stator.

19 Claims, 7 Drawing Figures

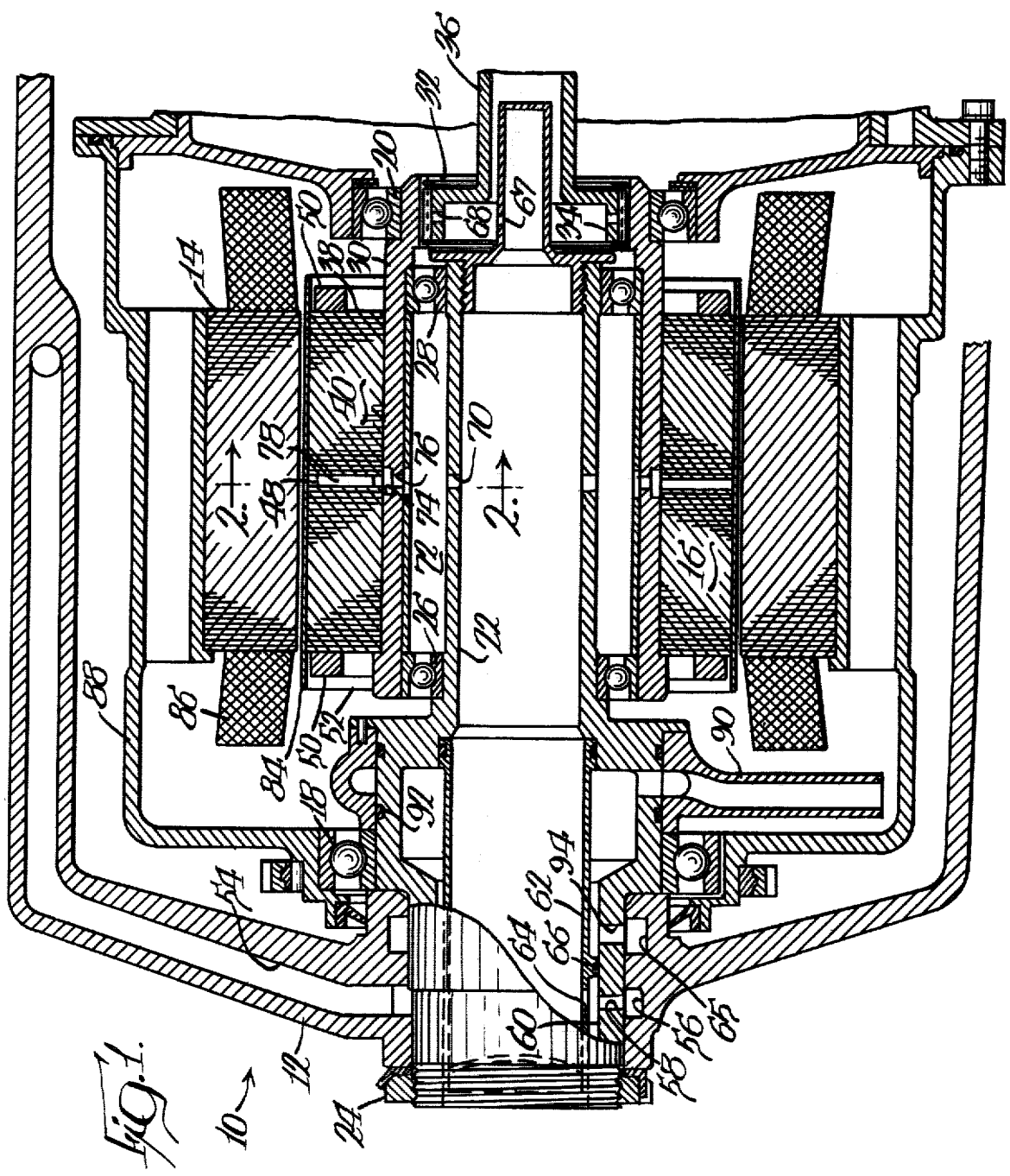

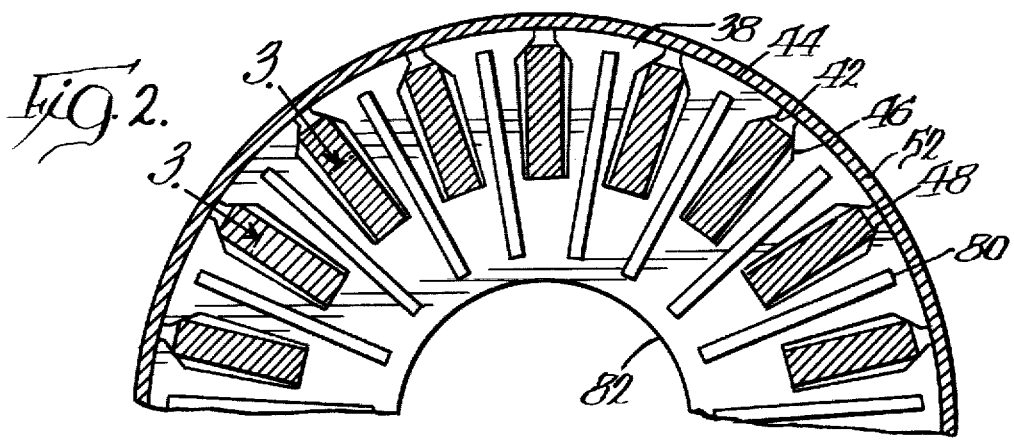
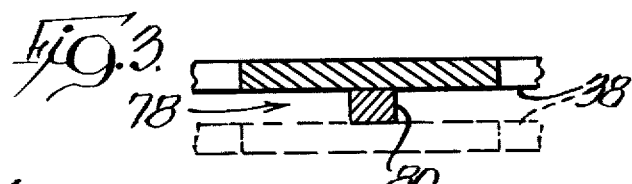
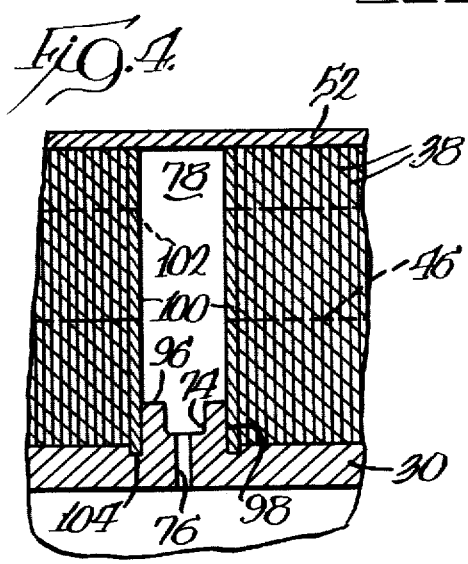
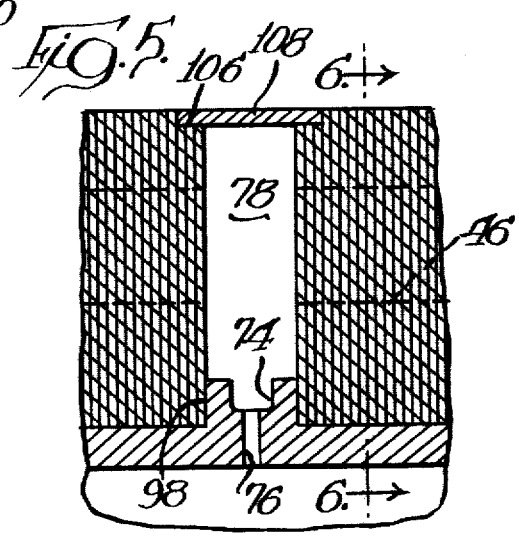
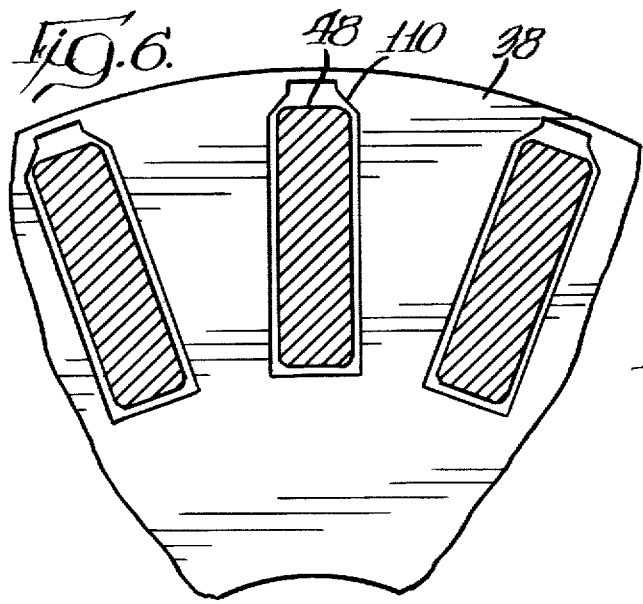
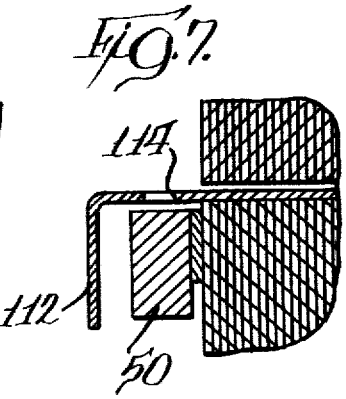

LIQUID COOLING FOR INDUCTION MOTORS

BACKGROUND OF THE INVENTION

This invention relates to the field of dynamoelectric machines which utilize a liquid as a cooling means, and particularly induction motors of the so-called "squirrel-cage" configuration. The present invention is an improvement over liquid cooled electrical machines such as those disclosed by U.S. Pat. No. 3,480,810 issued Nov. 25, 1969 to Potter which direct cooling fluid to a location adjacent heat producing rotor elements and depend upon the thermal conductivity of the rotor structure to conduct heat away from the primary heat source and to the liquid.

Electrical machines consist primarily of a rotor and a stator which both contain heat producing conductors. To increase rotor and stator current, and the efficiency of these machines, it is necessary to provide means to remove the heat produced by the resistance of the conductors to current flow. To this end, induction motors in the past have been cooled by forcing air through the rotor slots and around the rotor exterior. The drawback of these systems has been that heat transfer between the heat producing conductors and the air was not sufficient to provide adequate cooling.

Liquid cooling has been proposed, as in Potter above, but these attempted solutions have not proven adequate for one of two reasons. First, if cooling liquid is allowed to enter the gap between the rotor and the stator, more efficient cooling may result but increased rotational drag losses cause unacceptable power losses. Second, systems which prevent liquid from entering the gap between the rotor and the stator have done so by channeling cooling fluid to only a limited portion of the rotor and relying upon conductor support structure to transfer heat from the rotor conductors to the cooling liquid. Such systems decrease power losses but do not reach heat transfer efficiencies which would be possible if the cooling liquid were in contact with the heat source.

SUMMARY OF THE INVENTION

A liquid cooled induction motor is disclosed which channels cooling liquid directly to the heat producing rotor and stator conductors by means of a hollow rotor shaft and a central cavity formed in the rotor which communicates with axially extending slots substantially surrounding the rotor conductors.

Liquid is conducted to the interior of the hollow rotor shaft and flows through holes in the shaft to an annular cavity located at the center of the magnetic length of the rotor. The cavity is formed by separating adjacent rotor laminations either with spacers or by structure including shoulders on the shaft.

The liquid is contained within the rotor and directed to the ends thereof by a sleeve of non-magnetic material surrounding the rotor. The sleeve extends throughout the length of the rotor if the rotor slots are open at the periphery of the rotor, but may be shortened to span only the central cavity if the slots are closed. If the sleeve extends the full length of the rotor, the ends may be inturned to collect cooling liquid around the motor end ring.

BRIEF DESCRIPTION OF THE DRAWINGS

FIG. 1 is a longitudinal central sectional view of a dynamoelectric machine showing one embodiment of the invention;

FIG. 2 is a partial elevation of the center rotor lamination taken along line 2—2 of FIG. 1;

FIG. 3 is a partial sectional view taken generally along line 3—3 of FIG. 2;

FIG. 4 is a partial sectional view of the rotor similar to FIG. 2 showing an alternate structure for providing a cooling fluid distribution space;

FIG. 5 is a view similar to FIG. 4 showing yet another structure for providing a cooling fluid distribution space;

FIG. 6 is a partial elevation of a rotor lamination used in conjunction with the rotor configuration of FIG. 5; and FIG. 7 is a partial section of the rotor and stator showing an alternate sealing sleeve end configuration.

DESCRIPTION OF THE PREFERRED EMBODIMENT

Referring to FIG. 1 of the drawings, a dynamoelectric machine is indicated generally at 10 and, for example, is an induction or "squirrel-cage" motor. The motor 10 has a housing 12, a small portion of which is shown, it being understood that the housing 12 completely surrounds and encloses the working portion of the motor 10.

Located within the housing 12 is the motor stator 14 and rotor 16. In the particular embodiment shown in FIG. 1, the stator 14 is not stationary, but normally rotates relative to the housing 12 upon bearings 18 and 20 in a direction opposite to the direction of rotation of the rotor 16. While rotation of stator 14 is not essential to operation of the motor 10, rotor 16 rotational speed with respect to the housing 12 may be decreased while maintaining the same rotational output of the motor 10 by causing the stator 14 to rotate relative to the housing 12 by means of suitable differential gearing (not shown) between the rotor 16 and the stator 14. The rotational velocity of the stator 14 is then added directly to the rotational velocity of the rotor 16 relative to the stator 14. It is only necessary for the purposes of the invention to realize that the rotor 16 rotates and that it rotates relative to the housing 12 and the stator 14.

A hollow, stationary rotor support shaft 22 is fixed to the housing 12 by means of a ring nut 24. The purpose of the shaft 22 is to support the rotor 16, to direct cooling oil to the rotor 16 and conduct oil back to the oil circulation system from the interior of the motor 10.

To support the rotor 16, dual bearings 26 and 28 are longitudinally spaced along the support shaft 22 which carry a hollow rotor shaft 30. The rotor shaft 30 includes splines 32 formed at one end thereof which engage correspondingly formed splines 34 on an output shaft 36. The output shaft 36 is suitably attached to the apparatus to be driven (not shown). The stator 16 may also be attached to the apparatus to be driven by means of differential gearing as discussed above.

As best seen in FIG. 2, individual core laminations 38, which may be manufactured of silicon steel, are mounted on the rotor shaft 30 and form a rotor core 40. Each lamination 38 includes a number of partially closed cells 42 located adjacent the periphery 44 of the laminations 38. The laminations 38 are assembled such that these cells 42 are aligned to form longitudinal slots 46 which extend axially throughout the length of the rotor core 40.

To form the rotor conductors, electrically conductive bars 48, which may be copper or cast aluminum, are inserted into each of the rotor slots 46 and electrically connected to conducting end rings 50 located at both ends of the rotor core 40.

A cylindrical, electrically non-magnetic sleeve 52 completes the rotor assembly 16. This sleeve 52 fits tightly over the periphery 44 of the rotor laminations 38 to prevent cooling oil from entering the air gap between the rotor 16 and stator 14, as will be explained more fully herein.

The motor 10 may be a general utility motor and may be self-contained by using a portion of its output power to drive an oil circulation pump to provide cooling. Usually, however, the motor 10 will be used as a source of auxiliary power in conjunction with a larger prime mover (not shown). This prime mover will have an oil supply either for lubrication, cooling, or as part of a hydraulic drive. This invention contemplates using oil supplied from the prime mover as the cooling medium for the motor 10.

Oil from the prime mover is directed to one end of the rotor support shaft 22 by a passageway 54 located in the motor housing 12. The passageway 54 terminates in an annular groove 56 which surrounds the support shaft 22.

The support shaft 22 is hollow and contains a number of holes 58 which extend completely through the shaft wall and which are longitudinally aligned with the annular groove 56. These holes 58 conduct oil from the supply groove 56 to the interior of the support shaft 22.

Located inside the support shaft 22 is a separating tube 62 which permits oil to flow to the interior of the shaft 22 through a number of circumferential holes 64, and also prevents leakage between the annular groove 56 supplying oil and an adjacent return groove 65 by means of an annular seal 66.

Oil entering the support shaft 22 will travel to the right, as viewed in FIG. 1, until it can escape through passageways, such as the passageways 67 located on the opposite end of the shaft 22, where it is utilized for lubrication purposes. The two passageways 67 are included for illustration and provide lubrication to the splined joint 32, 34 between the rotor shaft 30 and the output shaft 36. This lubrication is accomplished by providing additional holes 68 at the spindled connection which conduct oil sprayed from the passageways 67 to the splines 32 and 34.

In this same fashion, passageways 70 are provided at the midpoint of the rotor core 40 to simultaneously lubricate the rotor bearings 26 and 28 and also supply oil to the rotor core 40 for the purpose of cooling the rotor conductors 48. The passageways 70 may be a single hole or multiple holes spaced around the circumference of the support shaft 22. In addition, the passageways 70 may be sized to act as restricting orifices to regulate oil flow and maintain oil pressure within the support shaft 22.

Oil conducted through the central passageways 70 will accumulate in and partially fill an annular cavity 72 formed between the outer surface of the support shaft 22 and the inner surface of the rotor shaft 30. Some of this oil will flow to the rotor bearings 26 and 28 to provide lubrication, but most will flow into a circumferential groove 74 formed in the outer surface of the rotor shaft 30 through a number of circumferentially spaced passageways 76. The rotor shaft passageways 76 may also be sized to act as restricting orifices and cause a greater or lesser amount of oil to be diverted through the bearings 26 and 28.

After exiting the circumferential groove 74, oil flows to a manifold area 78 created by separating two adjacent rotor laminations 38 located at the circumferential groove 74. The non-magnetic sleeve 52 which surrounds the laminations 38 confines oil to the manifold 78 and prevents the same from flowing into the air gap between the rotor 16 and the stator 14.

Referring to FIGS. 2 and 3, the manifold 78 is formed by attaching spacers 80 to one of the rotor laminations 38 located adjacent the circumferential groove 74. Since the spacers 80 do not extend completely across the face of the laminations 38, oil will be free to flow around the spacers 80 and completely fill the manifold 78 from the inner diameter 82 to the periphery 44 of the laminations 38.

As shown by FIG. 2, the individual lamination cells 42 are formed to provide a generous clearance around the conductors 48. When the laminations are assembled, these cells 42 will produce slots 46 extending away from the manifold 78 which will permit a substantial amount of oil to flow from the manifold 78 toward both ends of the rotor core 40 in contact with the conductors 48.

Oil flowing out of the rotor slots 46 will provide further cooling by flowing over and around the end rings 50 and around the edges 84 of the sleeve 52 to the stator conductors 86. Since the stator 14 is rotating and the stator conductors 86 slant away from the axis of rotation, oil impinging on the stator conductors 86 will flow outwardly toward and around the ends of the stator conductors 86 and be thrown outwardly to the inner surface of a stator support 88.

Throughout its passage, therefore, a large quantity of cooling oil will be in intimate contact with the rotor conductor bars 48, the rotor end rings 50, and the stator conductors 86, without flowing into the air space between the rotor 16 and the stator laminations 14.

Oil accumulating within the support 88 will be drawn into a transfer tube 90 attached to the rotor support shaft 22 and conducted to an annular cavity 92 within the shaft 22 surrounding the separating tube 62. Oil is then conducted through return passageways 94 located in the rotor support 22 to the housing return groove 65. As indicated earlier, the purpose of the support shaft inner tube 62 is to provide the annular seal 66 which functions to separate entering and exiting oil.

Oil in the housing groove 65 is returned to the oil circulating system by means of a housing passageway (not shown) similar to the housing inlet passageway 54, cooled, and returned to the motor 10.

In operation, oil will flow through the housing inlet passageway 54, through a series of support shaft passageways 58 and holes 64 into the interior of the rotor support shaft 22. Upon filling the hollow support shaft 22, supply pressure will cause oil to pass through a number of support shaft passageways 70 into an annular space 72 created between the rotor support shaft 22 and the rotor shaft 30. This oil will ultimately be conducted to the manifold area 78 created between two adjacent rotor core laminations 38 by a number of rotor passageways 76 and a circumferential groove 74 formed in the outer surface of the rotor 30. This cooling oil will be trapped in the manifold 78 by the non-magnetic cylindrical sleeve 52 which surrounds the rotor laminations 38 and extends on either side of the rotor core 40 beyond the rotor end conductor rings 50.

Rotor slots 46 formed by individual laminations cells 42 form a clearance surrounding each longitudinally extending rotor conductor bar 48 which retains oil in contact with the conductor bars 48 while permitting this oil to flow longitudinally toward each end of the rotor core 40 from the centrally located manifold 78. This cooling oil will then flow over the conductor end ring 50 and be directed by the outwardly extending sleeve ends 84 to the stator conductors 86. The stator conductors 86 are shaped to slope radially away from the rotor 16 to direct cooling oil away from the gap between the rotor 16 and stator 14 and against the stator support 88. Oil accumulating on the inner surface of the stator support 88 is conducted by a series of passageways to the housing groove 65 which communicates with the oil supply system to recirculate the cooling oil.

A system is thereby provided to maintain a substantial flow of cooling oil in intimate contact with the heat generating rotor conductors 48 and stator conductors 86 which increases heat transfer and efficiently cools the motor 10 without permitting oil to enter the gap between the rotor 16 and stator 14. Efficient cooling is thereby obtained without increasing rotational drag losses between internal moving parts which would increase power losses.

FIG. 4 illustrates an alternate method of producing the manifold cavity 78 at the center of the rotor core 40. In this construction, an annular projection 96 is formed at the center of the rotor 30 to provide retaining shoulders 98 on either side of the annular groove 74. The shoulders 98 support and separate central laminations 100 of increased thickness and sufficient mechanical strength to separate the laminations 38 without the necessity of supplying the spacers 80 used in construction of FIGS. 1 and 2. These central laminations 100 may be formed of either a magnetic or non-magnetic material and must of course contain throughholes 102 aligned with the rotor slots 46 to allow passage of the rotor conductors 48 and cooling oil.

As further illustrated in FIG. 4, a retaining sleeve 52 identical to that used in FIG. 1 is employed to prevent oil from entering the air gap between the rotor 16 and stator 14. Also, annular grooves 104 may be formed in the rotor 30 adjacent the shoulders 98 to retain the central laminations 100 and maintain these laminations 100 in an upright position.

FIG. 5 illustrates a modification which forms the manifold cavity 78 in a fashion similar to the construction of FIG. 4, but which allows the central laminations 100 to be eliminated and further allows the oil retaining sleeve 52 to be shortened. In this construction, a number of rotor laminations 38 adjacent and on either side of the rotor shoulders 98 are formed with a reduced diameter compared to the remaining laminations 38 to produce a step 106 at the periphery 44 of the rotor laminations 38 on either side of the manifold cavity 78. A shortened oil retaining sleeve or band 108 is located within the step 106 to prevent oil from escaping radially from the manifold cavity 78. Heavy central laminations 100, as those used in FIG. 4, need not be provided since the ends of the sleeve 108 bear upon the full sized laminations 38 to separate these laminations and create the manifold cavity 78.

It will be noted that in the construction of FIG. 5 the open-ended rotor slots 46 of FIG. 2 can no longer be employed. These open-ended slots 46 would permit oil to flow radially out of the slots 46 and enter the air gap between the rotor 16 and the stator 14. To prevent such oil flow, and the increased rotational drag losses which would be associated with such oil flow, the rotor laminations 38 used in the construction of FIG. 5 must be formed with closed throughholes 110 as illustrated in FIG. 6 rather than the open-ended cells 42 shown in FIG. 2. The closed throughholes 110 are formed to provide a clearance around the rotor conductor bars 48 to permit oil flow through the rotor core 40, as in the construction of FIG. 2, but with the closed construction, the laminations 38 themselves prevent radial oil flow thus eliminating the necessity of providing a rotor sleeve 52 which extends the entire length of the rotor core 40.

FIG. 7 illustrates that if a sleeve 52 were employed which extended beyond the ends of the rotor core 40, the ends 84 of this sleeve 52 need noit be cylindrical in shape, but may be shaped to more advantageously direct the flow of cooling oil. In FIG. 7, the sleeve 52 is formed with an inwardly turned flange 112 at each end and a throughhole 114 longitudinally aligned with the conductor end rings 50. The construction of FIG. 7 would be employed when increased cooling of the end ring 50 is desired, and this increased cooling would be obtained because the inwardly turned flange 112 would cause a pool of cooling oil to be formed around the end ring 50 thus ensuring that heat would be conducted to the oil from the entire periphery of the ring 50.

The holes 114 may be provided to direct oil against the stator conductors 86, or the holes 114 may be eliminated and oil allowed to flow around the edge of the flange 112. Of course, the holes 114 may be sized to cause a partial flow of oil through the holes 114 and also a partial flow of oil around the flange 112. In this fashion, oil may be directed in the manner which would most efficiently cool the stator conductors 86 and the end rings 50.

It must be recognized that the foregoing specification described only the preferred construction of an oil cooled motor, and is not an attempt to illustrate all advantageous forms of construction which would embody the principles of this invention. Other aspects, objects, and advantages will become apparent through a close study of the drawings, specification and appended claims.

I claim:

1. A liquid cooled dynamoelectric machine comprising, a housing, a stator in said housing, a rotor within said stator with an air gap therebetween, a series of slots within said rotor and extending axially thereof, said slots opening to the ends of the rotor and having their radial outer ends in noncommunicating relation with said air gap, conductors mounted in said slots and having lesser transverse dimensions than said slots to provide clearance spaces around said conductors which define liquid channels, and means for supplying a cooling liquid to said channels for flow along said channels and intimate and substantially surrounding contact with said conductors.

2. The machine of claim 1 wherein said cooling liquid is supplied to said channels intermediate the ends thereof for flow toward the ends of the rotors.

3. The liquid cooled dynamoelectric machine of claim 1 wherein said liquid supply means includes an internal annular cavity within said rotor in fluid communication with said channels, and means for supplying a liquid to said cavity.

4. The liquid cooled dynamoelectric machine of claim 3 wherein said rotor is comprised of two stacks of laminations separated to form said cavity.

5. The liquid cooled dynamoelectric machine of claim 3 or 4 wherein said slots intersect said cavity to conduct liquid from said cavity along said conductors.

6. The liquid cooled dynamoelectric machine of claim 5 including means for radially retaining said liquid within said rotor.

7. The liquid cooled dynamoelectric machine of claim 6 wherein said liquid retaining means includes a sleeve of non-magnetic material surrounding and extending the full length of said rotor.

8. A liquid cooled dynamoelectric machine comprising a housing, a rotor formed in at least two sections mounted within said housing, said rotor sections being separated centrally of the rotor length to form an annular, enclosed cavity therebetween, longitudinal slots formed in said rotor sections, rotor conductors mounted within said slots extending through said rotor sections and across said cavity, and means for supplying a flow of cooling liquid to said cavity and said slots.

9. The liquid cooled dynamoelectric machine of claim 8 further comprising means for radially containing said liquid within said cavity including a sleeve surrounding and bridging said rotor sections.

10. The liquid cooled dynamoelectric machine of claim 9 wherein said sleeve is of non-magnetic material and extends the full longitudinal length of said rotor.

11. The liquid cooled dynamoelectric machine of claim 8 wherein said rotor sections are each formed of a stack of laminations containing holes aligned to form said slots.

12. The liquid cooled dynamoelectric machine of claim 11 wherein two of said rotor laminations are separated by spacers to form said cavity.

13. The liquid cooled dynamoelectric machine of claim 11 wherein said rotor laminations are mounted on a hollow shaft journaled in said housing and said means for supplying a cooling liquid to said cavity includes at least one orifice passage extending through said shaft in fluid communication with said cavity, and means for conducting liquid to the interior of said shaft.

14. A liquid cooled dynamoelectric machine comprising a housing, a hollow shaft mounted in said housing, an annular rotor core mounted on said shaft and formed of at least two sections separated and spaced along said shaft to form a cavity defined by opposed ends of said rotor sections and said shaft, means for conducting cooling liquid to the interior of said shaft, passages in said shaft to provide fluid communication between the interior of said hollow shaft and said cavity, conductors mounted in said rotor sections, slot means surrounding said conductors for directing liquid along said conductors from said cavity to the ends of said rotor sections opposite said cavity and means for containing said liquid within said cavity and said slot means throughout the combined length of said cavity and said rotor sections.

15. A liquid cooled dynamoelectric machine comprising a rotor core constructed of a series of thin annular laminations mounted on a shaft and containing a plurality of conductors extending therethrough, each conductor being electrically connected at each end to each other by a common electrical conductor, a stator including windings surrounding said rotor and extending beyond each end of said conductors, means for separating two adjacent central laminations to form a cavity in fluid communication with said conductors, means for conducting a cooling liquid to said cavity, slot means surrounding and extending along said conductors for conducting liquid from said cavity along said conductors, and sleeve means for preventing said liquid from entering a gap between said rotor core and said stator.

16. The liquid cooled dynamoelectric machine of claim 15 wherein said lamination separating means comprises spaced annular shoulders formed on said shaft, each of said shoulders bearing against adjacent laminations to form said cavity, and wherein said sleeve means comprises a cylindrical, non-magnetic sleeve in contact with the periphery of said adjacent laminations.

17. The liquid cooled dynamoelectric machine of claim 16 wherein the laminations adjacent each shoulder are reduced in diameter with respect to the remaining rotor core laminations and said sleeve surrounds and bridges said reduced diameter laminations, and the outer diameter of said sleeve is substantially equal to the diameter of the remaining lamination to form a substantially continuous surface between said remaining laminations.

18. The liquid cooled dynamoelectric machine of claim 15 wherein said sleeve means comprises a sleeve in contact with the periphery of said laminations and includes an inturned flange beyond each of said common conductors whereby cooling liquid flowing along said conductors will be collected in an annular pool surrounding each of said common conductors.

19. The liquid cooled dynamoelectric machine of claim 18 further including at least one hole through said sleeve adjacent said common conductors whereby liquid will be directed by centrifugal force against said stator windings.

* * * * *